United States Patent [19]
Holmes

[11] Patent Number: 4,818,997
[45] Date of Patent: Apr. 4, 1989

[54] REMOTE OUTPUT INDICATOR FOR PROVIDING OUTPUT INDICATIONS FROM A REMOTELY LOCATED RADAR DETECTOR

[76] Inventor: Steven C. Holmes, 2925 Charing Cross Rd., Oklahoma City, Okla. 73120

[21] Appl. No.: 2,424

[22] Filed: Jan. 12, 1987

[51] Int. Cl.⁴ .................................................. G01S 7/04
[52] U.S. Cl. ........................................ 342/20; 342/176; 340/533; 340/600; 340/904; 455/345; 455/353
[58] Field of Search .................. 342/20; 180/16.7; 296/37.1, 37.7; 340/74, 75, 600, 901, 902, 531, 76, 79, 80, 352, 353, 533, 904; 455/39, 49, 57, 132, 227, 229, 345, 346, 349

[56] References Cited

U.S. PATENT DOCUMENTS

| | | | |
|---|---|---|---|
| 3,924,232 | 12/1975 | Burdi et al. | 342/20 X |
| 4,001,805 | 1/1977 | Golbe | 340/527 |
| 4,081,751 | 3/1978 | Maddaloni | 455/154 |
| 4,181,910 | 1/1980 | Hitterdal | 342/29 |
| 4,189,720 | 2/1980 | Lott | 340/539 |
| 4,190,838 | 2/1980 | Kemp | 342/20 |
| 4,280,223 | 7/1981 | Roettele et al. | 375/93 |
| 4,318,103 | 3/1982 | Roettele et al. | 342/20 |
| 4,417,235 | 11/1983 | Del Grande | 340/531 |
| 4,456,903 | 6/1984 | Kishi et al. | 340/531 X |
| 4,520,349 | 5/1985 | Varano | 340/531 |
| 4,573,041 | 2/1986 | Kitagawa et al. | 340/538 |
| 4,633,521 | 12/1986 | Liautaud | 455/345 |

FOREIGN PATENT DOCUMENTS 0016991 10/1980 European Pat. Off. ............ 340/531

OTHER PUBLICATIONS

Csere et al., "Find The Hidden Radar Detector"; Car and Driver (3/85; pp. 63–69).
Exhibit A–advertisement for Eclipse Products, Inc.
Exhibit B–advertisement for Remote Systems.
Exhibit C–an article entitled "Find the Hidden Radar Detector", by Csaba Csera and Don Sherman, Mar. 1985, Car and Driver.

Primary Examiner—Theodore M. Blum
Assistant Examiner—Bernarr E. Gregory
Attorney, Agent, or Firm—Dunlap, Codding & Peterson

[57] ABSTRACT

A remote indicator for use with an existing radar detector wherein a remote unit is located near the existing radar detector for sensing output indications from the radar detector and for providing output signals in response to and indicative of the radar detector output indications, and a console remotely located from the existing radar detector for receiving the remote unit output signals and for providing output indications indicative thereof and in response thereto.

8 Claims, 2 Drawing Sheets

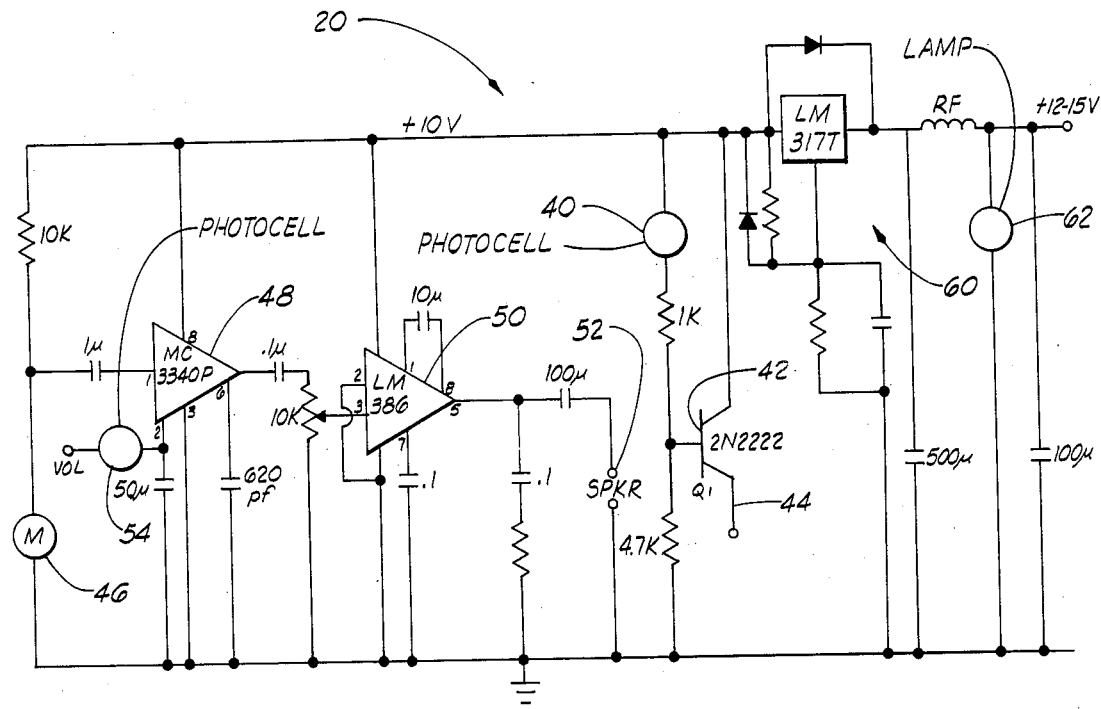
FIG. 3
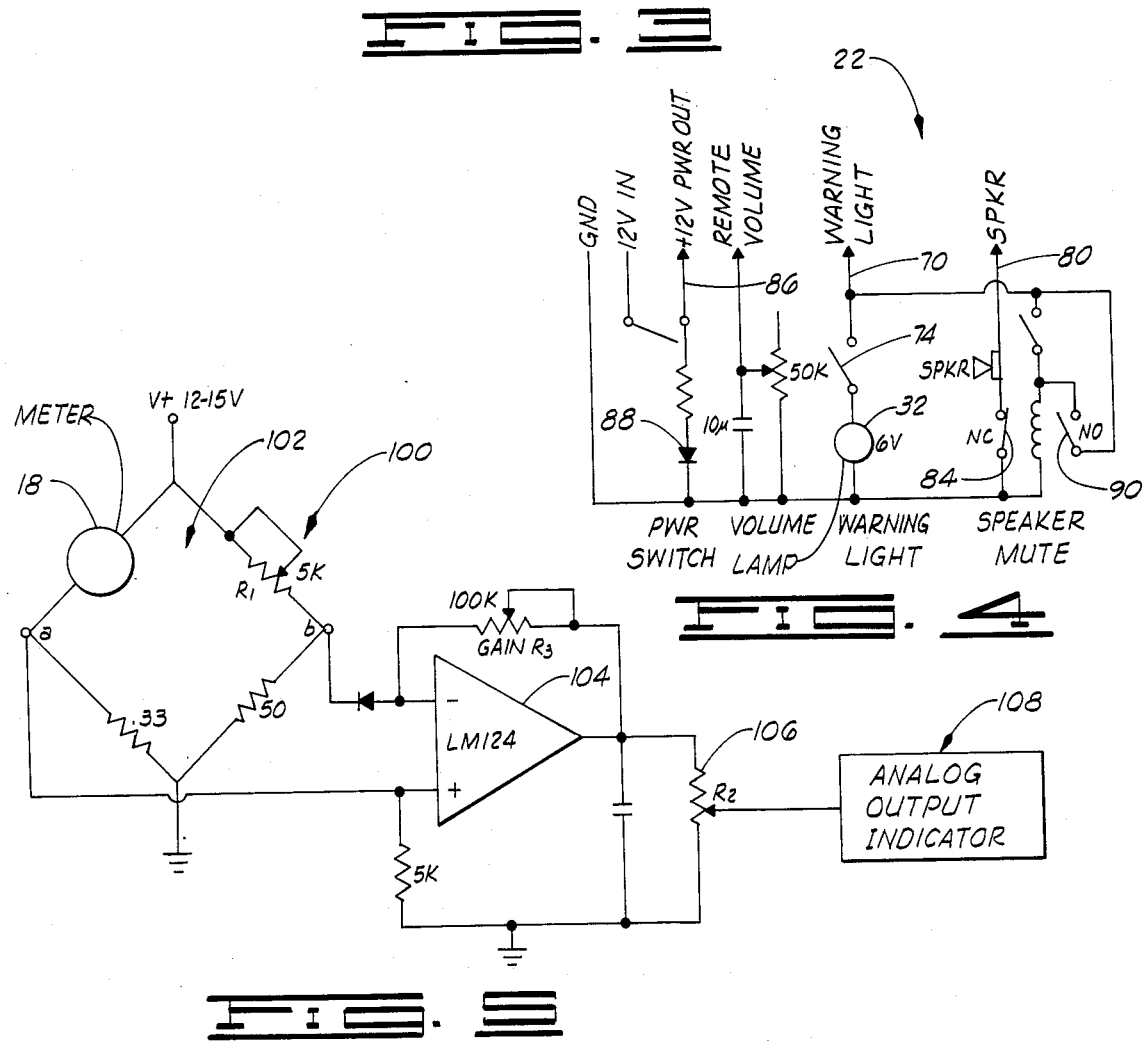
FIG. 4
FIG. 5

REMOTE OUTPUT INDICATOR FOR PROVIDING OUTPUT INDICATIONS FROM A REMOTELY LOCATED RADAR DETECTOR

BACKGROUND OF THE INVENTION

Field of the Invention

The present invention relates generally to a means for providing output indications of a radar detector at a location remotely located from the radar detector and, more particularly but not by way of limitation, the present invention relates to a remote output indicator for providing output indications of a radar detector at a console remotely located from the radar detector so the radar detector can be mounted on an automobile within a protected space to substantially prevent theft of the radar detector.

BRIEF DESCRIPTION OF THE DRAWINGS

FIG. 3 is a schematic drawing showing the remote unit portion of the remote output indicator of FIG. 1.

FIG. 4 is a schematic drawing showing the console portion of the remote output indicator of FIG. 1.

FIG. 5 is a schematic drawing of another output indicator which may be included in the remote output indicator of FIG. 1.

DESCRIPTION OF THE PREFERRED EMBODIMENTS

Figure 1:
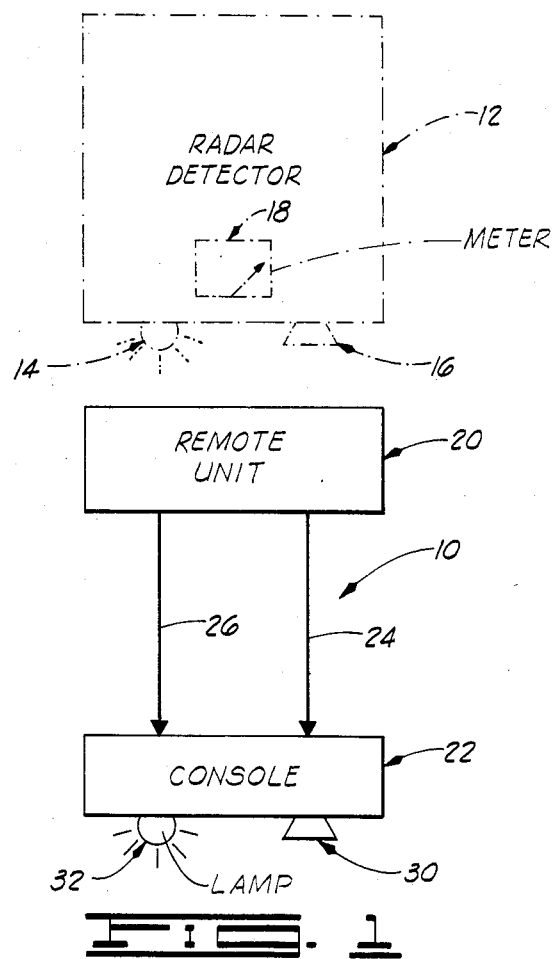
FIG. 1 is a schematic drawing showing an existing radar detector and showing a remote output indicator which is constructed in accordance with the present invention.

Referring to the drawings in general and FIG. 1 in particular, shown therein and designated by the general reference numeral 10 is a remote output indicator which is constructed in accordance with the present invention. The remote output indicator 10 is adapted to be used in connection with an existing, commercially available radar detector 12, the radar detector 12 being shown in dashed lines in FIG. 1.

The radar detector 12 is adapted to sense or detect signals outputted by an operating radar when the radar detector 12 is within a predetermined proximity of the operating radar. The radar detector 12 detects the signals outputted by the operating radar and provides an output indication in response to receiving or detecting such signals thereby providing an output indication indicating that the radar detector 12 is within the predetermined proximity of an operating radar. More particularly, the radar detector 12 includes a lamp 14 for providing a radar detector visibly perceivable output indication in response to detecting signals from an operating radar and the radar detector 12 also includes a speaker 16 for providing a radar detector audibly perceivable output indication in response to detecting signals from an operating radar. The radar detector 12 also includes an output indicator 18 which basically consists of a meter and the radar detector 12 is constructed to detect the signals outputted by an operating radar and to provide a visually perceivable output indication via the meter 18 indicating that an operating radar is within a predetermined proximity of the radar detector 12 and providing an indication of the distance between the radar detector 12 and the operating radar. Radar detectors which are constructed and which operate in the manner described before with respect to the radar detector 12 are commercially available from various sources such as Cincinnati Microwave's Escort, for example, and thus a detailed description of the construction and operation of such a radar detector is not deemed necessary herein. Further, radars for detecting the speed of automobiles are common and well known and a detailed description of the construction and operation of such radars is not deemed necessary herein.

The remote output indicator 10 of the present invention consists of a remote unit 20 and a console 22. The remote unit 20 is located near the radar detector 12 and includes one portion for sensing the radar detector audibly perceivable output indication provided by the speaker 16 and another portion for sensing the radar detector 12 visually perceivable output indication provided by the lamp 14. When the remote unit 20 senses an audibly perceivable output indication outputted by the radar detector 12, the remote unit 20 outputs a signal on a signal path 24 in response to and indicative of the radar 12 audibly perceivable output indication. When the remote unit 20 senses or detects a visually perceivable output indication outputted by the radar detector 12, the remote unit 20 outputs a signal on a signal path 26 in response to and indicative of the radar detector 12 visually perceivable output indication. The console 22 is remotely located from the radar 12 and the remote unit 20 and the console 22 is adapted to receive the signals outputted by the remote unit 20 on the signal paths 24 and 26. In response to receiving a signal outputted by the remote unit 20 on the signal path 24, the console 22 outputs an audibly perceivable output indication by way of a speaker 30 thereby providing or outputting an audibly perceivable output indication indicating that the radar detector 12 has outputted an audibly perceivable output indication. In response to receiving a signal on the signal path 26 outputted by the remote unit 20, the console 22 outputs a visually perceivable output indication by way of a lamp 32 thereby providing a visually perceivably output indication indicating that the radar detector 12 has outputted a visually perceivable output indication.

Figure 2:
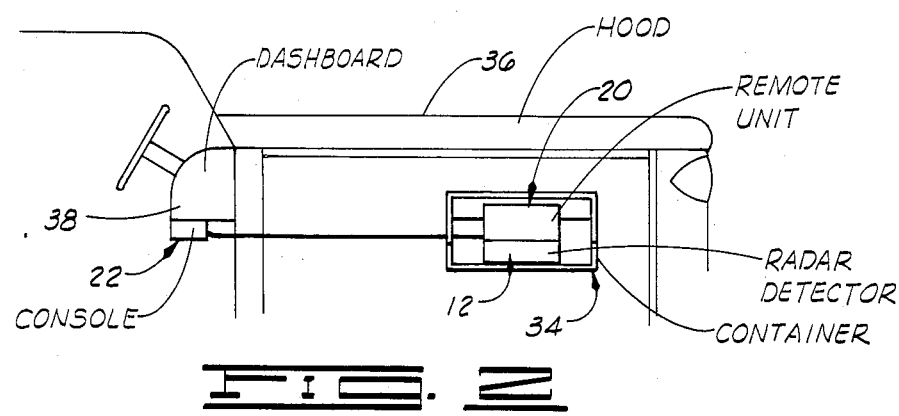
FIG. 2 is a diagrammatic view showing the remote unit and the radar detector mounted within a protected space of an automobile and showing the console mounted within a driver perceivable location within an automobile, the remote unit and the console comprising the remote output indicator.

As shown in FIG. 2, the system of the present invention includes a container 34 which is sized and shaped so that the remote unit 20 and the radar detector 12 each are mounted within the container 34. The container 34 is securely connected to a portion of an automobile within a protected space which has a limited excess such as under a hood 36 of an automobile, as diagrammatically illustrated in FIG. 2. The console 22 is mounted and located within a driver perceivable location such as on or under a dashboard 38 of the automobile, as diagrammatically illustrated in FIG. 2. The console 22 thus is located so that the visually perceivable output indication and the audibly perceivable output indication can in fact be perceived by the driver or operator of the automobile. Thus, the remote output indicator 10 of the present invention provides a system whereby the radar detector 12 can be secured to the automobile within the protected space within the automobile and the console 22 is locatable at a position where the operator of the automobile easily can perceive the audibly and visually perceivable output indication outputted by the console 22.

In the past, it has been common to mount radar detectors on or under the dash of an automobile so that the visually perceivable and audibly perceivable output indications of the radar detector can be perceived by the operator of the automobile. Also, in the past, it has been common for individuals to steal radar detectors mounted in this manner. The present invention provides a means for mounting radar detectors in a manner so that the radar detector substantially is protected from theft. Thus, in accordance with the present invention, the radar detector 12 and the remote unit 20 are mounted or connected to the automobile and located within the protected space within the automobile such as under the hood of an automobile thereby substantially preventing the theft of the remote unit 20 and the radar detector 12. The console 22 is mounted at the driver perceivable location to provide the visually perceivable and audibly perceivable output indications. As in the past with respect to radar detectors, the console 22 of the present invention still is mounted within an area which is subject to theft of the console 22; however, the console 22 is substantially less expensive as compared to the cost of the radar detector and the console 22 has virtually no use without the remote unit 20 and the radar detector 12 which are located within the protected space, thereby reducing the possibility of theft of the console 22.

The remote unit 20 is schematically shown in FIG. 3 in greater detail. As shown in FIG. 2, the remote unit 20 includes a photocell 40 which is connected to the remote unit 20 so that the photocell 40 can be placed in close proximity to the lamp 14 of the radar detector 12. When the lamp 14 is on or emitting light, the photocell 40 detects the light emitted from the lamp 14 and switches a transistor 42 on thereby conducting current over a conductor 44. The conductor 44 is connected to the signal path 26 and provides the output signal outputted over the signal path 26 from the remote unit 20. A microphone 46 is positioned in the remote unit 20 so that the microphone 46 can be positioned in close proximity to the speaker 16 of the radar detector 12. When the speaker 16 provides the audibly perceivable output indication from the radar detector 12, the microphone 46 detects this audibly perceivable output indication and provides an output signal which is amplified by amplifiers 48 and 50. The output from the amplifier 50 is connected to an output terminal 52 and the output terminal 52 is connected to the signal path 24 to provide the output signal indicating a sensed or detected audibly perceivable output indication outputted by the radar detector 12.

The remote unit 20 also includes a second photocell 54 which is mounted on the remote unit 20 in such a manner that the photocell 54 can be mounted near the lamp 14 of the radar detector 12. When the lamp 14 outputs a visually perceivable output indication, the photocell 54 is conditioned in a conducting state thereby conditioning the amplifier 48 to receive and amplify signals. Thus, with respect to the particular embodiment of the remote unit 20 shown in FIG. 3, the remote unit 20 will not output any signals on the signal paths 24 or 26 unless the remote unit 20 senses a visually perceivable output indication outputted by the radar detector 12. This substantially prevents the microphone 46 from causing a signal to be outputted from the remote unit 20 in response to sensed or detected noise.

As shown in FIG. 3, the remote unit 20 also includes a filter and voltage regulator 60 for substantially eliminating noise and voltage transience. The remote unit 20, as shown in FIG. 3, also includes a lamp 62. In some embodiments, the radar detectors include a photocell for sensing daylight conditions and causing the visually perceivable output indications to be less bright in night or dark conditions and to be more bright in daylight conditions. It is desirable to have the lamp 14 always output light in the brightest condition to facilitate detection by the remote unit 14. Thus, the lamp 62 is mounted on the remote unit 20 so that the lamp 62 can be positioned in close proximity to the photocell on the radar detector 12 for providing a light output so that the photocell on the radar detector 12 senses a daylight condition at all times thereby increasing the brightness of the light outputted by the lamp 14 of the radar detector 12.

One preferred embodiment of the console 22 is shown schematically in greater detail in FIG. 4. The console 22 receives the signal over the signal path 26 by way of a conductor 70 thereby illuminating the lamp 32 to provide the visually perceivable output indication outputted by the console 22. A switch 74 is interposed in the conduit 70 so that, in the open position of the switch 74, a visually perceivable output indication can not be outputted by the console 22.

The signal on the signal path 24 is connected to a conductor 80 so that the signal on the signal 24 is received by the console on the signal path 80. The console 22 receives the signal on the signal path 24 over a conductor 80 which is connected to the speaker 30. Thus, when the remote unit 20 outputs a signal on the signal path 24 indicating an audibly perceivably output indication outputted by the radar detector 12, the console 22 receives the signal on the signal path 80 and energizes the speaker 32 to provide the audible output indication outputted by the console 22. A switch 8 is interposed in the conductor 80 so that, in the open position of the switch 84, the console 82 will not output audibly perceivable output indications.

The power for the console 22 is connected to a conductor 86 and a LED type lamp 88 is interposed in the conductor 86 for providing a visually perceivable output indication indicating that the console 22 in fact is receiving power.

The console 22 also includes a switch 90 which is connected to the speaker 32 such that, in the open position of the switch 90, the speaker 32 is disabled so that the speaker 82 can not provide audible output indications while the remote output indicator 10 is providing output indications by way of the lamp 62, the switch 90 being positioned in the closed position after the lamp 62 is extinguished.

Shown in FIG. 5 is an additional output indicator 100 which may be included with the remote output indicator 10 in addition to lamp 32 and speaker 30. In this embodiment, the current to the meter output indicator 18 of the radar detector 12 is connected to one leg of a wheatstone bridge 102. The output of the wheatstone bridge 102 is amplified by an amplifier 104 and the amplifier 104 output is provided across a resistor 106, the output being connected to and inputted into an analog output indicator 108.

In operation, the resistance value of a resistor 110 located in one leg of the wheatstone bridge 102 is adjusted to balance the wheatstone bridge 102 and, in the balanced condition of the wheatstone bridge 102, the wheatstone bridge 102 outputs a null or zero signal. When a radar is operating within a predetermined proximity of the radar detector 12, current is provided to the meter 18 and this current also is provided across the one leg of the wheatstone bridge 102 thereby increasing the voltage outputted by the wheatstone bridge and it is this voltage which is amplified by the amplifier 104 and provided at the resistor 106 to provide the input to the analog output indicator 108. As the radar detector 12 is moved into closer proximity to the operating radar detector 12, the current across the one leg of the wheatstone bridge 102 is increased thereby increasing the voltage outputted by the wheatstone bridge 102 to the amplifier 104. Thus, the output provided to the analog output indicator 108 provides an output indication indicating that the radar detector 12 is within a predetermined proximity of an operating radar and provides an indication as to the distance between the radar detector 12 and the operating radar.

The analog output indicator 108 may be an LED bargraph or analog meter. LED bargraphs and analog meters are well known in the art and a detailed description of the construction and operation of such output indicators is not deemed necessary herein.

When incorporating the output indicator 100 in the remote output indicator 10, analog output indicator 108 is located in the console 22 and the remaining components shown in FIG. 5 are located in the remote unit 20. Thus, most of the components of the output indicator 100 are mounted with the protected space of the automobile for reasons described before.

Changes may be made in the construction and the operation of the various parts, elements and assemblies described herein and changes may be made in the steps or the sequence of steps of the methods described herein without departing from the spirit and the scope of the invention as defined in the following claims.

What is claimed is:

1. A remote indicator for use with a radar detector providing a perceivable output indication for detecting signals from an operating radar, the remote indicator comprising:
   a remote unit locatable near the radar detector having one portion for sensing the radar detector perceivable output indication and providing an output signal in response to and indicative of the radar detector perceivable output indication; and
   a console remotely located from the radar detector and remote unit receiving the output signal from the remote unit indicative of the radar detector perceivable output indication and providing a perceivable output indication in response to receiving the output signal indicative of the radar detector perceivable output indication from the remote unit.

2. The remote output indicator of claim 1 wherein the radar detector is defined further has having a speaker and wherein the perceivable output indication provided by the radar detector is defined further as being a radar detector audibly perceivable output indication provided by the speaker of the radar detector in response to detecting signals from an operating radar, and wherein the remote unit is defined further as having one portion for sensing the radar detector audibly perceivable output indication and providing the output signal in response to and indicative of the radar detector audibly perceivable output indication, and wherein the console is defined further as receiving the output signal indicative of the radar detector audibly perceivable output indication from the remote unit and wherein the output indication provided by the console is defined further as being an audibly perceivable output indication provided in response to receiving the output signal from the remote unit indicative of the radar detector audibly perceivable output indication.

3. The remote output indicator of claim 2 wherein the remote unit is defined further to include:
   a microphone for sensing the radar detector audibly perceivable output indication and providing the output signal in response to and indicative of the radar detector audibly perceivable output indication.

4. The remote output indicator of claim 3 wherein the console is defined further to include:
   a speaker receiving the output signal from the remote unit indicative of the radar detector audibly perceivable output indication and providing the audibly perceivable output indication from the console.

5. The remote output indicator of claim 4 wherein the console is defined further to include:
   a lamp receiving the output signal from the remote unit indicative of the radar detector visibly perceivable output indication and providing the visually perceivable output indication from the console.

6. The remote output indicator of claim 1 wherein the radar detector is defined further as having a lamp and wherein the output indication provided by the radar detector is defined further as being a radar detector visually perceivable output indication provided by the lamp in response to detecting signals from an operating radar, and wherein the remote unit is defined further as having one portion for sensing the radar detector visually perceivable output indication and providing the output signal in response to and indicative of the radar detector visually perceivable output indication, and wherein the console is defined further as receiving the remote unit output signal indicative of the radar detector visually perceivable output indication and wherein the output indication provided by the console is defined further as being a visually perceivably output indication provided in response to and indicative of the output signal received from the remote unit indicative of the radar detector visually perceivable output indication.

7. The remote output indicator of claim 6 wherein the remote unit is defined further to include:
   a photocell for sensing the radar detector visually perceivable output indication and providing the output signal in response to and indicative of the radar detector visually perceivable output indication.

8. The remote indicator of claim 1 wherein the radar detector and the remote output indicator each are defined further as being mountable on a automobile having a driver perceivable location located within a portion of the automobile so that the operator of the automobile can perceive visually and audibly perceivable output indications provided within the driver perceivable location and having a protected space which has limited access, and wherein the remote indicator is defined further to include:
   means for mounting the radar detector in the protected space;
   means for mounting the remote unit in the protected space near the radar detector; and
   means for mounting the console in the driver perceivable location, thereby substantially protecting the radar detector and remote unit from unauthorized access while simultaneously providing output indications at the driver perceivable location.

* * * * *